(12) United States Patent
Ueno et al.

(10) Patent No.: US 10,749,424 B2
(45) Date of Patent: Aug. 18, 2020

(54) SWITCHING POWER SUPPLY

(71) Applicant: BROTHER KOGYO KABUSHIKI KAISHA, Nagoya-shi, Aichi-ken (JP)

(72) Inventors: Shiro Ueno, Ichinomiya (JP); Hiroyuki Naganawa, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/244,205

(22) Filed: Jan. 10, 2019

(65) Prior Publication Data

US 2019/0214900 A1    Jul. 11, 2019

(30) Foreign Application Priority Data

Jan. 11, 2018 (JP) ................. 2018-002325

(51) Int. Cl.
| H02M 1/08 | (2006.01) |
|---|---|
| H02M 1/32 | (2007.01) |
| H02M 3/335 | (2006.01) |
| H02M 7/217 | (2006.01) |

(52) U.S. Cl.
CPC .............. H02M 1/32 (2013.01); H02M 1/08 (2013.01); H02M 3/33523 (2013.01); H02M 7/2176 (2013.01)

(58) Field of Classification Search
CPC combination set(s) only.
See application file for complete search history.

(56) References Cited

U.S. PATENT DOCUMENTS

| 2003/0123265 A1* | 7/2003 | Uchida | H02M 1/32 |
| | | | 363/21.12 |
| 2005/0219868 A1 | 10/2005 | Inukai | |
| 2009/0180302 A1* | 7/2009 | Kawabe | H02M 3/33523 |
| | | | 363/21.01 |
| 2010/0054790 A1 | 3/2010 | Inukai | |
| 2013/0002746 A1* | 1/2013 | Takayanagi | B41J 29/38 |
| | | | 347/14 |
| 2015/0318685 A1* | 11/2015 | Hsieh | G06F 1/30 |
| | | | 363/53 |
| 2019/0050010 A1* | 2/2019 | Kasahara | B41J 2/04548 |

FOREIGN PATENT DOCUMENTS

| JP | 2005-295663 A | 10/2005 |
| JP | 2009-189103 A | 8/2009 |
| JP | 2009-195073 A | 8/2009 |
| JP | 2010-057327 A | 3/2010 |
| JP | 2015-012709 A | 1/2015 |

* cited by examiner

*Primary Examiner* — Gary L Laxton
*Assistant Examiner* — Ivan Laboy
(74) *Attorney, Agent, or Firm* — Scully, Scott, Murphy & Presser, PC

(57) ABSTRACT

A switching power supply includes: a transformer; a switching device, which is connected to a primary coil of the transformer; a switching controller; a voltage generation circuit, which rectifies and smooths an AC voltage induced in an auxiliary coil provided on the primary side of the transformer, and output the rectified and smoothed AC voltage as a first DC voltage; and an overvoltage protection circuit, wherein the auxiliary coil and the switching controller are connected via a capacitor, and the switching controller stops the switching control depending on a change in at least one of a current and a voltage between electrodes of the capacitor, the change being caused by a voltage rise of the AC voltage induced in the auxiliary coil.

2 Claims, 3 Drawing Sheets

SWITCHING POWER SUPPLY

CROSS-REFERENCE TO RELATED APPLICATION

This application claims priority from Japanese Patent Application No. 2018-002325 filed on Jan. 11, 2018 the entire subject matter of which is incorporated herein by reference.

TECHNICAL FIELD

This disclosure relates to a switching power supply.

BACKGROUND

For example, a switching power supply device disclosed in the background art is provided with a constant voltage diode in which the driving voltage to the control circuit is generated such that the DC voltage obtained by rectifying-and-smoothing the AC voltage induced in the auxiliary coil drops.

SUMMARY

However, in the switching power supply device disclosed in the background art, since the short circuit part is short-circuited after the AC voltage induced in the auxiliary coil exceeds a predetermined voltage, timing of operating the overvoltage protection function may be delayed.

This disclosure provides a switching power supply capable of promptly performing protection against an overvoltage of an output voltage on a secondary side of a transformer.

A switching power supply of this disclosure includes: a transformer; a switching device connected to a primary coil of the transformer; a switching controller provided on a primary side of the transformer and including an input terminal inputted to a driving voltage, the switching controller performing switching control of the switching device so that an output voltage on a secondary side of the transformer becomes a target voltage and stop the switching control of the switching device in a case where a voltage identified as an overvoltage is inputted to the input terminal; a voltage generation circuit rectifying and smoothing an AC voltage induced in an auxiliary coil provided on the primary side of the transformer, and outputting a first DC voltage as the rectified and smoothed AC voltage, the voltage generation circuit including a rectifying diode and a smoothing capacitor; and an overvoltage protection circuit generating the driving voltage from the first DC voltage and inputting the generated driving voltage to the input terminal in a case where the first DC voltage outputted by the voltage generation circuit does not exceed a predetermined voltage, and inputting the voltage identified as the overvoltage to the input terminal in a case where the first DC voltage exceeds the predetermined voltage. The auxiliary coil and the switching controller are connected via a detection capacitor, and the switching controller stops the switching control depending on a change in at least one of a current and a voltage between electrodes of the detection capacitor, the change being caused by a voltage rise of the AC voltage induced in the auxiliary coil.

According to the configuration described above, the voltage generation circuit outputs the first DC voltage by rectifying-and-smoothing the AC voltage induced in the auxiliary coil provided on the primary side of the transformer. In a case where the first DC voltage does not exceed the predetermined voltage, the overvoltage protection circuit generates the driving voltage from the first DC voltage, and then inputs the generated driving voltage to the input terminal of the switching controller. The switching controller is driven by the driving voltage inputted to the input terminal.

In a case where the output voltage on the secondary side of the transformer becomes the overvoltage and the AC voltage induced in the auxiliary coil becomes high whereby the first DC voltage exceeds the predetermined voltage, the overvoltage protection circuit inputs the voltage identified as the overvoltage to the input terminal of the switching controller. Accordingly, the switching controller stops switching control of the switching device.

The auxiliary coil and the switching controller are connected to each other via the capacitor. In a case where the AC voltage induced in the auxiliary coil starts to rise, the current or the voltage between the electrodes of the capacitor between the auxiliary coil and the switching controller changes. The switching controller stops the switching control of the switching device depending on the change in the current or the voltage in addition to the input of the voltage identified as the overvoltage regarding the overvoltage protection circuit. Accordingly, in a case where the output voltage on the secondary side of the transformer becomes the overvoltage, it is possible to stop the switching control of the switching device before the first DC voltage exceeds the predetermined voltage value.

Accordingly, it is possible to promptly perform protection against the overvoltage of the output voltage on the secondary side of the transformer.

According to this disclosure, it is advantageously possible to promptly perform the protection against the overvoltage of the output voltage on the secondary side of the transformer.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, embodiments of this disclosure will be described in detail with reference to the accompanying drawings.

First Embodiment

Figure 1:
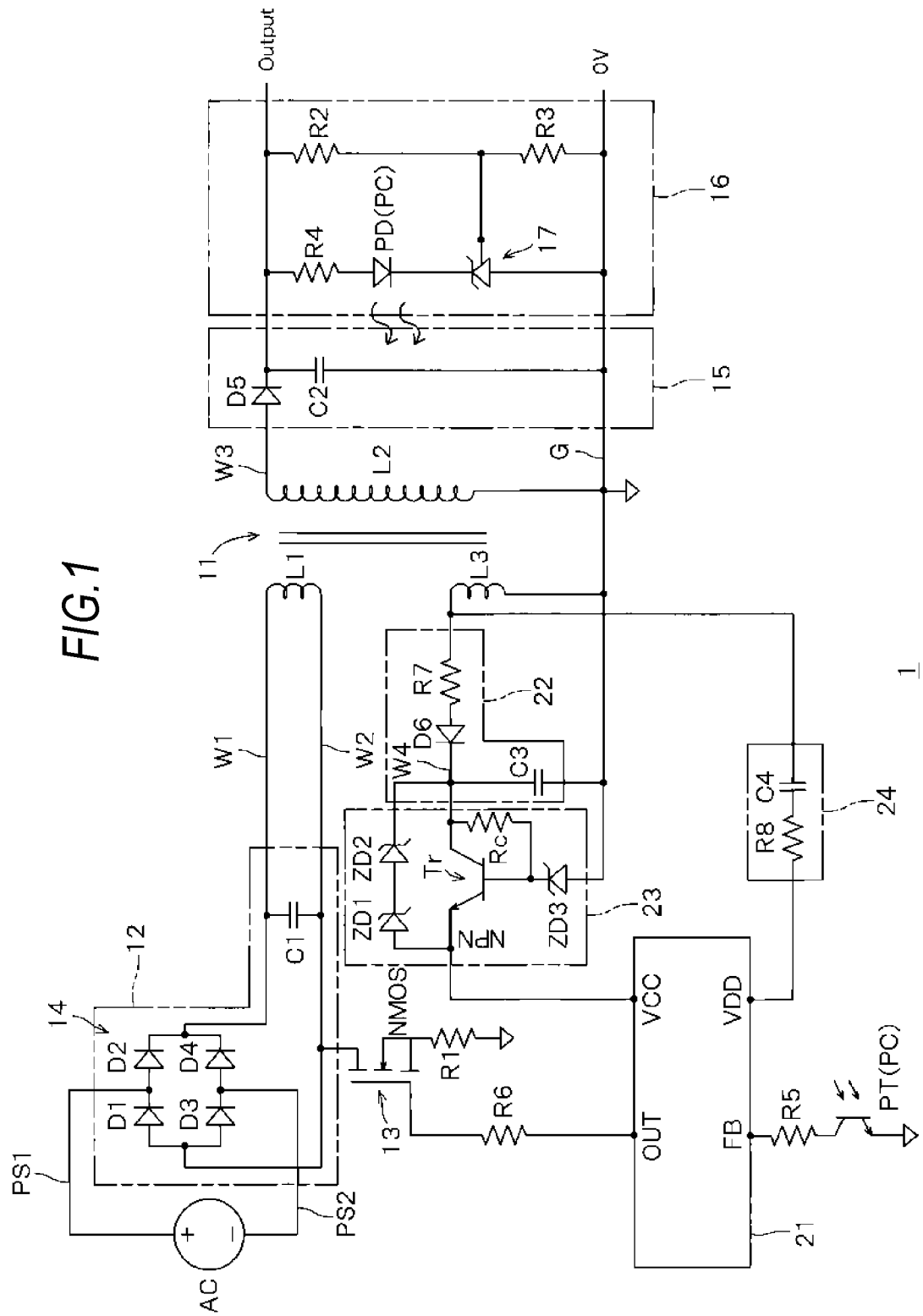
FIG. 1 is a circuit diagram illustrating a switching power supply according to a first embodiment of this disclosure.

A switching power supply 1 illustrated in FIG. 1 converts an AC voltage supplied from a commercial alternating current power supply AC via a pair of power supply lines PS1 and PS2 into a DC voltage. For example, the switching power supply 1 is mounted on an electronic device such as a printer, and the like. The switching power supply 1 is provided with a transformer 11 and is divided into a primary side where a primary coil L1 is provided and a secondary side where a secondary coil L2 is provided, with the transformer 11 as a boundary. An auxiliary coil L3 is provided on the primary side in the transformer 11.

The switching power supply 1 is provided with a primary side rectifying-and-smoothing circuit 12 and a switching device 13 on the primary side of the transformer 11.

The primary side rectifying-and-smoothing circuit 12 includes a diode bridge 14 and a smoothing capacitor C1.

The diode bridge 14 is a circuit having a configuration in which four pieces of diodes D1, D2, D3, and D4 are bridge-connected. Specifically, in the diode bridge 14, a series circuit of two pieces of the diodes D1 and D2 and a series circuit of two pieces of the remaining diodes D3 and D4 are connected in parallel. The power supply lines PS1 and PS2 are respectively connected to a connection point of the diodes D1 and D2 in one series circuit and a connection point of the diodes D3 and D4 in the other series circuit. One connection point of the series circuit of the diodes D1 and D2 and the series circuit of the diodes D3 and D4 is connected to one end of the primary coil L1 of the transformer 11 via a wiring W1. The other connection point thereof is connected to the other end of the primary coil L1 via a wiring W2.

One electrode of the smoothing capacitor C1 is connected to the wiring W1, and the other electrode thereof is connected to the wiring W2.

The AC voltage supplied from the commercial alternating current power supply AC is full-wave rectified by the diode bridge 14, and the voltage after the full-wave rectification is smoothed by the smoothing capacitor C1, thereby generating the DC voltage between the wirings W1 and W2.

The switching device 13 is formed of an N-channel typed MOSFET (NMOS), and a drain terminal thereof is connected to the wiring W2. A source terminal of the switching device 13 is grounded via a resistor R1. The switching device 13 performs a switching operation (on/off) by a voltage inputted to a gate terminal.

When the switching device 13 is turned on, current flows through the primary coil L1 of the transformer 11, and energy is accumulated in the primary coil L1. Thereafter, when the switching device 13 is turned off, the energy accumulated in the primary coil L1 is released, whereby an electromotive force is generated in the primary coil L1, and a secondary voltage corresponding to a turn ratio of the primary coil L1 and the secondary coil L2 is generated in the secondary coil L2 of the transformer 11. The secondary voltage is generated in a pulse manner by repeating the turning on/off of the switching device 13.

The switching power supply 1 is provided with a secondary side rectifying-and-smoothing circuit 15 and a constant voltage circuit 16 on the secondary side of the transformer 11.

The secondary side rectifying-and-smoothing circuit 15 includes a rectifying diode D5 and a smoothing capacitor C2. One end of the secondary coil L2 of the transformer 11 is connected to an output terminal via a wiring W3, and the other end thereof is connected to a ground line G (0 V). The rectifying diode D5 is interposed in the wiring W3 such that an anode of the diode D5 is directed toward a secondary coil L2 side. One electrode of the smoothing capacitor C2 is connected to the wiring W3 on a cathode side of the rectifying diode D5, and the other electrode thereof is connected to the ground line G. The secondary voltage generated in the pulse manner in the secondary coil L2 is rectified and smoothed by the secondary side rectifying-and-smoothing circuit 15 and then is converted into the DC voltage.

The constant voltage circuit 16 includes a shunt regulator integrated circuit (IC) 17, resistors R2, R3, and R4, and a photocoupler PC. The resistors R2 and R3 are connected to each other in series. One end of a series circuit of the resistors R2 and R3 is connected to the wiring W3, and the other end thereof is connected to the ground line G. A voltage at a connection point between the resistor R2 and the resistor R3 is inputted to the shunt regulator IC 17 as a reference voltage. In a light emitting diode PD of the photocoupler PC, an anode is connected to the wiring W3 via the resistor R4, and a cathode is connected to the shunt regulator IC 17. According to the configuration described above, a constant voltage (Output) is outputted from the output terminal. When the voltage outputted from the output terminal (hereinafter referred to as an "output voltage on the secondary side") exceeds the reference voltage, the light emitting diode PD of the photocoupler PC emits light.

The switching power supply 1 is provided with a switching controller 21 on the primary side of the transformer 11. The switching controller 21 is formed of an IC in which a CPU or the like are incorporated, and includes a first terminal FB, a second terminal OUT, a third terminal VCC, and a fourth terminal VDD.

A phototransistor PT on a light receiving side of the photocoupler PC is connected to the first terminal FB via a resistor R5. Accordingly, when the output voltage on the secondary side exceeds the reference voltage and the light emitting diode PD of the photocoupler PC emits light, the phototransistor PT is conducted, and the voltage is inputted to the first terminal FB. Since a current flowing through the light emitting diode PD increases or decreases depending on a potential difference between the output voltage on the secondary side and the reference voltage, a light emitting amount of the light emitting diode PD increases or decreases. Since a current flowing through the phototransistor PT changes depending on an increase or a decrease of the light emitting amount, the voltage inputted to the first terminal FB changes.

The second terminal OUT of the switching controller 21 is connected to the gate terminal of the switching device 13 via a resistor R6. The switching controller 21 controls a duty ratio of the switching operation of the switching device 13, based upon the input voltage of the first terminal FB which changes depending on the output voltage on the secondary side. Accordingly, the output voltage on the secondary side is constantly maintained.

The switching power supply 1 is provided with a voltage generation circuit 22 and an overvoltage protection circuit 23 on the primary side of the transformer 11.

The voltage generation circuit 22 includes a rectifying diode D6, a resistor R7, and a smoothing capacitor C3. A wiring W4 is connected to one end of the auxiliary coil L3. The rectifying diode D6 is interposed in the wiring W4 such that an anode of the diode D6 is directed toward an auxiliary coil L3 side. The resistor R7 is interposed between the anode of the rectifying diode D6 and one end of the auxiliary coil L3. One electrode of the smoothing capacitor C3 is connected to the wiring W4 on a cathode side of the rectifying diode D6, and the other electrode thereof is connected to the ground line G. When the secondary voltage is generated in the pulse manner in the secondary coil L2, a voltage is generated in the pulse manner in the auxiliary coil L3. The voltage generated in the pulse manner in the auxiliary coil L3 is rectified and smoothed by the voltage generation circuit 22, and then is converted into the DC voltage.

The overvoltage protection circuit 23 includes an NPN transistor Tr and three pieces of Zener diodes ZD1, ZD2, and ZD3. A collector of the NPN transistor Tr is connected to the wiring W4. An emitter of the NPN transistor Tr is connected to the third terminal VCC of the switching controller 21. The Zener diodes ZD1 and ZD2 are connected to each other in series, a cathode of one Zener diode ZD2 is connected to the collector of the NPN transistor Tr, and an anode of the other Zener diode ZD1 is connected to the emitter of the NPN transistor Tr. A cathode of the Zener diode ZD3 is connected to a base of the NPN transistor Tr, and an anode of the Zener diode ZD3 is connected to the ground line G. A resistor Rc is interposed between the collector of the NPN transistor Tr and the cathode of the Zener diode ZD3.

When the output voltage on the secondary side of the transformer 11 is in a steady state, a current flows through the Zener diode ZD3 and the resistor Rc by the DC voltage of the wiring W4, and a constant voltage, which is lowered only by a base-emitter voltage of the NPN transistor Tr from a breakdown voltage of the Zener diode ZD3, is inputted to the third terminal VCC of the switching controller 21.

For example, when an abnormality such as a failure of the photocoupler PC occurs in the switching power supply 1 and normal control of the switching operation of the switching device 13 by the switching controller 21 becomes impossible. Then the switching device 13 performs the switching operation at a maximum duty ratio, the output voltage on the secondary side starts to rise, and accordingly, the voltage induced in the auxiliary coil L3 rises and the DC voltage of the wiring W4 starts to rise. When the Zener diodes ZD1 and ZD2 are conducted by the rise of the DC voltage of the wiring W4, a voltage that is obtained by subtracting withstand voltages of the Zener diodes ZD1 and ZD2 from the DC voltage of the wiring W4 is inputted to the third terminal VCC of the switching controller 21. According to the fact that the voltage inputted to the third terminal VCC exceeds a predetermined voltage value which is identified as the overvoltage, the switching controller 21 operates an overvoltage protection function and stops the switching operation of the switching device 13, thereby lowering the output voltage on the secondary side.

However, since the overvoltage protection function is not operated until the driving voltage exceeds the predetermined voltage value identified as the overvoltage, timing of operating the overvoltage protection function may be delayed. Therefore, the switching power supply 1 is provided with a current input circuit 24 on the primary side of the transformer 11.

The current input circuit 24 includes a resistor R8 and a detection capacitor C4. One electrode of the detection capacitor C4 is connected to the wiring W4 between the auxiliary coil L3 and the resistor R7, and the other electrode thereof is connected to one end of the resistor R8. The other end of the resistor R8 is connected to the fourth terminal VDD of the switching controller 21.

When the output voltage on the secondary side is a constant voltage, since the voltage induced in the auxiliary coil L3 is constant, a current that changes in a sine wave shape with a constant amplitude is inputted to the fourth terminal VDD of the switching controller 21. When the output voltage on the secondary side changes, since the voltage induced in the auxiliary coil. L3 changes, magnitude of the current (the current flowing through the detection capacitor C4) inputted to the fourth terminal VDD of the switching controller 21 changes. The switching controller 21 stops the switching operation of the switching device 13 depending on the change of the current. Accordingly, when the output voltage on the secondary side becomes the overvoltage, the switching control of the switching device 13 can be stopped before the predetermined voltage value identified as the overvoltage is inputted to the third terminal VCC of the switching controller 21.

Operational Effect

As described above, according to the fact that the output voltage on the secondary side of the transformer 11 is changed from a constant voltage to the overvoltage, the voltage induced in the auxiliary coil L3 is changed and the voltage applied to the detection capacitor C4 is changed, whereby the magnitude of the current inputted to the fourth terminal VDD of the switching controller 21 via the resistor R8 is changed. The change in the magnitude of the current appears earlier than an occurrence in which the DC voltage of the wiring W4 exceeds the respective breakdown voltages of the Zener diodes ZD1 and ZD2. Accordingly, the protection against the overvoltage of the output voltage on the secondary side can be promptly performed.

Second Embodiment

Figure 2:
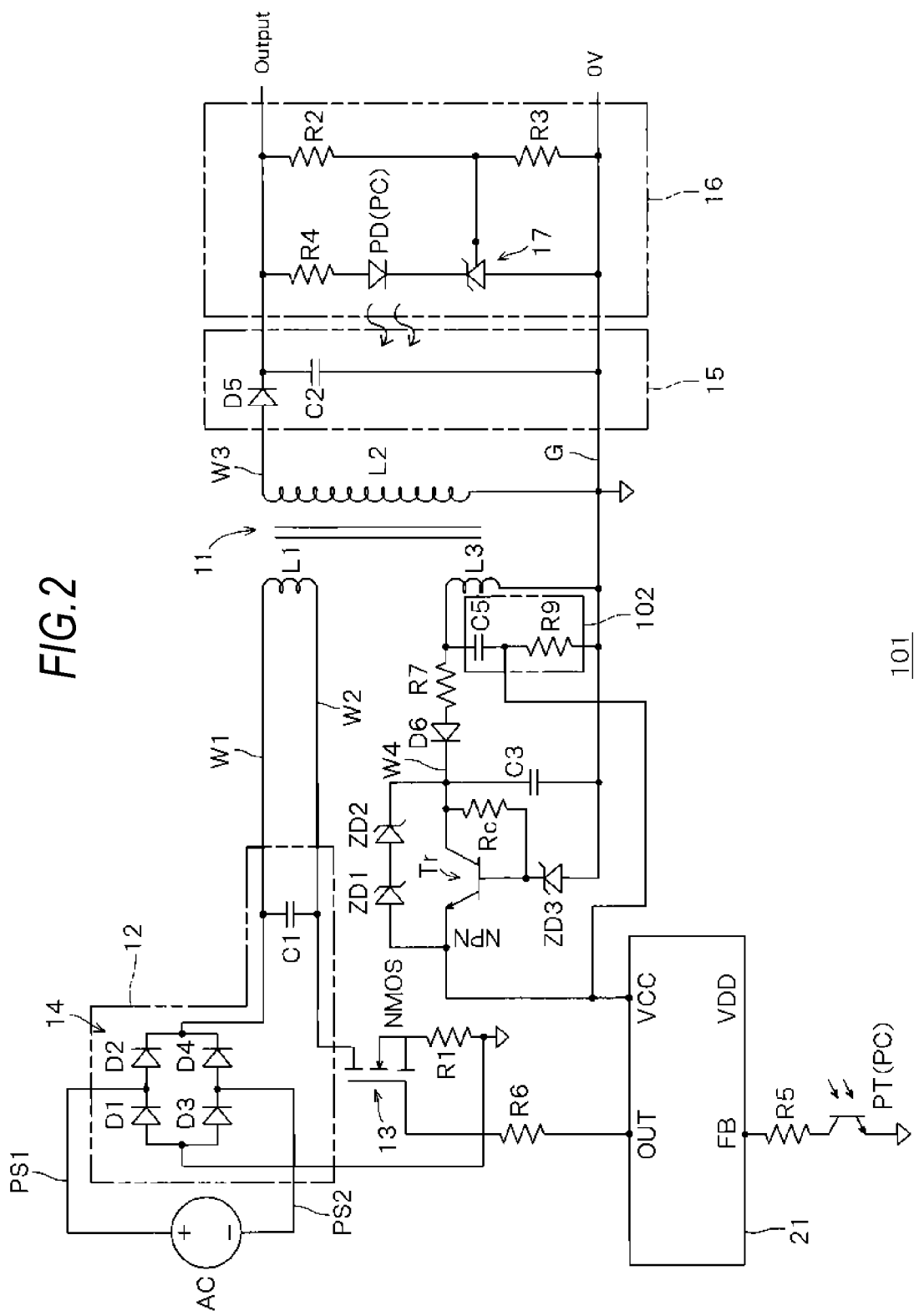
FIG. 2 is a circuit diagram illustrating a switching power supply according to a second embodiment of this disclosure.

Parts corresponding to the respective parts illustrated in FIG. 1, the same reference signs will be denoted thereto in FIG. 2. Descriptions of the parts to which the same reference signs are denoted will be omitted, and only differences between the configurations illustrated in FIGS. 1 and 2 will be hereinafter described.

In a switching power supply 101 illustrated in FIG. 2, the current input circuit 24 is omitted from the configuration of the switching power supply 1 illustrated in FIG. 1, and a bias voltage input circuit 102 is added.

The bias voltage input circuit 102 includes a resistor R9 and a detection capacitor C5. One electrode of the detection capacitor C5 is connected to the wiring W4 between the auxiliary coil L3 and the resistor R7, and the other electrode thereof is connected to one end of the resistor R9. The other end of the resistor R9 is connected to the ground line G. A connection point between the resistor R9 and the detection capacitor C5 is connected to the third terminal VCC of the switching controller 21.

When the output voltage on the secondary side is a constant voltage, since the voltage induced in the auxiliary coil L3 is constant, a voltage at the connection point between the resistor R9 and the detection capacitor C5 as well as the driving voltage according to the output voltage on the secondary side are inputted to the third terminal VCC of the switching controller 21. When the output voltage on the secondary side rises, since the voltage induced in the auxiliary coil L3 rises, the driving voltage rises and amplitude of the voltage at the connection point between the resistor R9 and the detection capacitor C5 rises. Therefore, when the output voltage on the secondary side rises, a voltage value that is obtained by adding the voltage at the connection point between the resistor R9 and the detection capacitor C5 to the driving voltage exceeds the predetermined voltage value earlier than an occurrence in which a value of the driving voltage exceeds the predetermined voltage value identified as the overvoltage. Accordingly, the switching controller 21 operates the overvoltage protection function and stops the switching operation of the switching device 13, thereby lowering the output voltage on the secondary side.

Operational Effect

Even in the configuration described above, when the output voltage on the secondary side becomes the overvoltage, it is possible to stop the switching control of the switching device 13 before the driving voltage inputted to the third terminal VCC of the switching controller 21 exceeds the predetermined voltage value identified as the overvoltage. Accordingly, the protection against the overvoltage of the output voltage on the secondary side can be promptly performed.

In the steady state where the output voltage on the secondary side is constant voltage, a resistance value of the resistor R9 and electrostatic capacitance of the detection capacitor C5 are determined so that a value of the voltage at the connection point between the resistor R9 and the detection capacitor C5 does not exceed the predetermined voltage value identified as the overvoltage.

Third Embodiment

Figure 3:
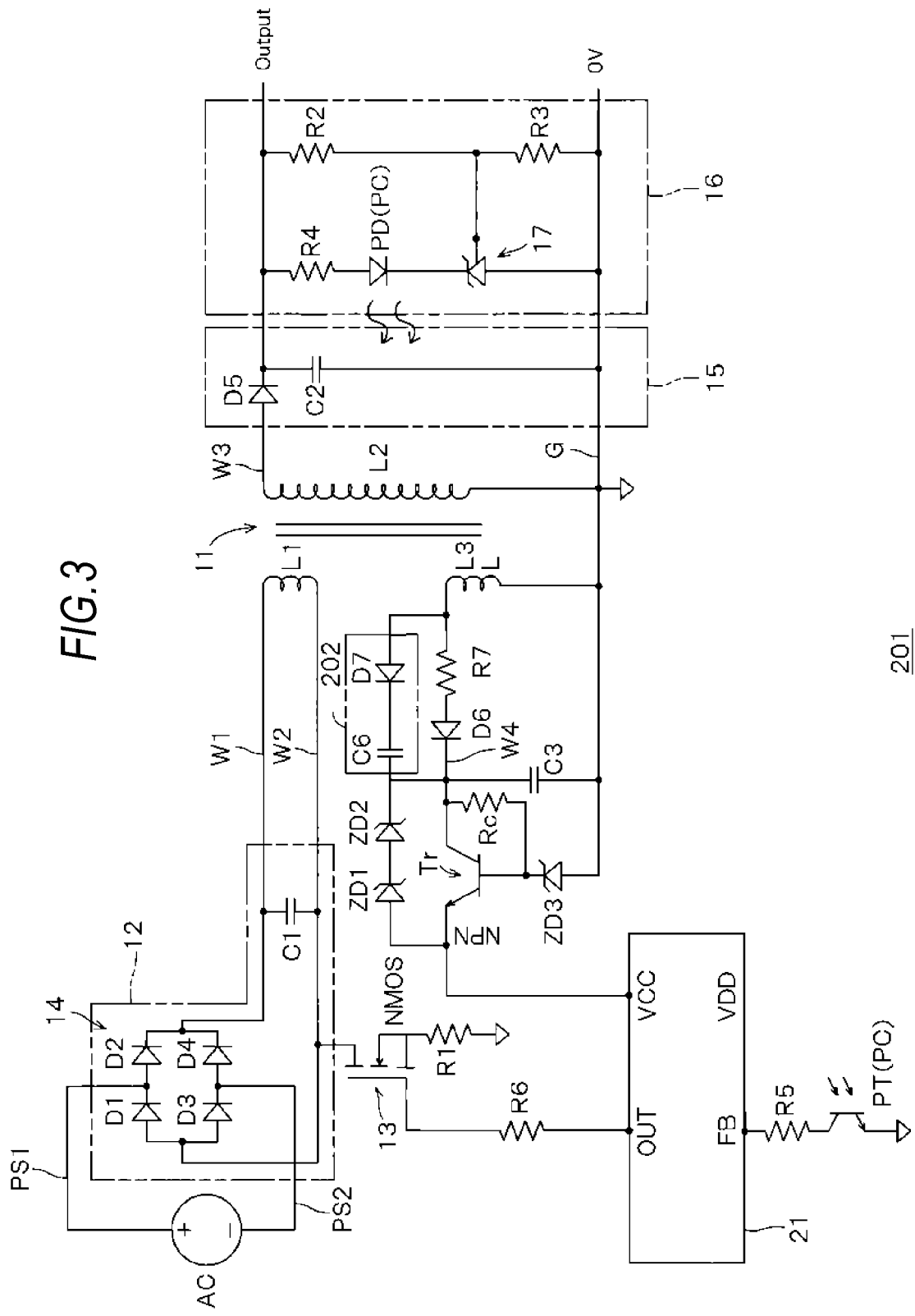
FIG. 3 is a circuit diagram illustrating a switching power supply according to a third embodiment of this disclosure.

Regarding parts corresponding to the respective parts illustrated in FIG. 1, the same reference signs will be denoted thereto in FIG. 3. Descriptions of the parts to which the same reference signs are denoted will be omitted, and only differences between the configurations illustrated in FIGS. 1 and 3 will be hereinafter described.

In the switching power supply 201 illustrated in FIG. 3, the current input circuit 24 is omitted from the configuration of the switching power supply 1 illustrated in FIG. 1, and a circuit 202 in which a detection capacitor C6 and a diode D7 are connected to each other in series is added.

One electrode of the detection capacitor C6 is connected to the collector of the NPN transistor Tr, and the other electrode thereof is connected to a cathode of the diode D7. An anode of the diode D7 is connected to the wiring W4 between one end of the auxiliary coil L3 and the resistance R7 of the voltage generation circuit 22.

Same as the circuit illustrated in FIG. 1, when the output voltage on the secondary side of the transformer 11 is in the steady state, a constant voltage, which is lowered only by the base-emitter voltage of the NPN transistor Tr from the breakdown voltage of the Zener diode ZD3, is inputted to the third terminal VCC of the switching controller 21. When the output voltage on the secondary side rises steeply, and accordingly, the voltage induced in the auxiliary coil L3 rises steeply, a current flows through the circuit 202 in which the detection capacitor C6 and the diode D7 are connected to each other in series. As the Zener diodes ZD1 and ZD2 are conducted accordingly, the voltage that is obtained by subtracting the withstand voltages of the Zener diodes ZD1 and ZD2 from the DC voltage of the wiring W4 is inputted to the third terminal VCC of the switching controller 21. According to the fact that the voltage inputted to the third terminal VCC exceeds the predetermined voltage value identified as the overvoltage, the switching controller 21 operates the overvoltage protection function and stops the switching operation of the switching device 13, thereby lowering the output voltage on the secondary side. When the output voltage on the secondary side slowly rises, same as the circuit illustrated in FIG. 1, when the DC voltage of the wiring W4 exceeds the respective breakdown voltages of the Zener diodes ZD1 and ZD2 such that the Zener diodes ZD1 and ZD2 are conducted, the voltage that is obtained by subtracting the withstand voltages of the Zener diodes ZD1 and ZD2 from the DC voltage of the wiring W4 is inputted to the third terminal VCC of the switching controller 21.

Operational Effect

According to the configuration described above, when output voltage on the secondary side steeply rises, the switching control of the switching device 13 can be stopped before the driving voltage inputted to the third terminal VCC of the switching controller 21 exceeds the predetermined voltage value identified as the overvoltage. Accordingly, it is possible to promptly perform the protection against the overvoltage of the output voltage on the secondary side.

MODIFIED EXAMPLE

Hereinabove, the third embodiment of this disclosure is described, but this disclosure can be implemented in other modifications, and the above-mentioned configurations can be modified with various design changes within the scope without departing from the scope described in the claims.

What is claimed is:
1. A switching power supply, comprising:
a transformer;
a switching device connected to a primary coil of the transformer; a switching controller provided on a primary side of the transformer and including an input terminal inputted to a driving voltage, the switching controller performing switching control of the switching device so that an output voltage on a secondary side of the transformer becomes a target voltage and stops the switching control of the switching device in a case where a voltage identified as an overvoltage is inputted to the input terminal;
a voltage generation circuit rectifying and smoothing an AC voltage induced in an auxiliary coil provided on the primary side of the transformer, and outputting a first DC voltage as the rectified and smoothed AC voltage, the voltage generation circuit including a rectifying diode and a smoothing capacitor;
an overvoltage protection circuit generating the driving voltage from the first DC voltage and inputting the generated driving voltage to the input terminal in a case where the first DC voltage outputted by the voltage generation circuit does not exceed a predetermined voltage, and inputting the voltage identified as the overvoltage to the input terminal in a case where the first DC voltage exceeds the predetermined voltage;
a detection capacitor configured to connect the auxiliary coil and the switching controller; and
a bias voltage input circuit configured to connect the detection capacitor and a first resistor in series between one end of the auxiliary coil and the other end thereof, connect a connection point between the detection capacitor and the first resistor to the input terminal, and input a bias voltage lower than the voltage identified as the overvoltage to the input terminal,
wherein
the switching controller stops the switching control of the switching device depending on a change in at least one of a current and a voltage between electrodes of the detection capacitor, the change being caused by a voltage rise of the AC voltage induced in the auxiliary coil, and
the switching controller stops the switching control of the switching device in a case where the driving voltage is further inputted while the bias voltage is being inputted to the input terminal, so that a voltage exceeding the overvoltage is inputted to the input terminal.
2. The switching power supply according to claim 1, wherein the overvoltage protection circuit includes a Zener diode between one end of the auxiliary coil and the input terminal.

* * * * *